(12) United States Patent
Hamner et al.

(10) Patent No.: US 9,452,791 B2
(45) Date of Patent: Sep. 27, 2016

(54) HYDRO-FORM BONDED BOLSTER

(71) Applicant: Continental Structural Plastics, Inc., Auburn Hills, MI (US)

(72) Inventors: Kim Robert Hamner, Troy, MI (US); Pat Short, Troy, MI (US)

(73) Assignee: Continental Structural Plastics, Inc., Auburn Hills, MI (US)

( * ) Notice: Subject to any disclaimer, the term of this patent is extended or adjusted under 35 U.S.C. 154(b) by 0 days.

(21) Appl. No.: 14/289,242

(22) Filed: May 28, 2014

(65) Prior Publication Data

US 2014/0354013 A1    Dec. 4, 2014

Related U.S. Application Data

(60) Provisional application No. 61/827,819, filed on May 28, 2013.

(51) Int. Cl.
*B60J 7/00* (2006.01)
*B62D 29/00* (2006.01)
*B62D 25/08* (2006.01)
*B21D 26/033* (2011.01)

(52) U.S. Cl.
CPC ........... *B62D 29/005* (2013.01); *B62D 25/085* (2013.01); *B21D 26/033* (2013.01); *Y10T 29/49622* (2015.01)

(58) Field of Classification Search
CPC ..... B60G 9/003; B60G 11/27; B60R 21/045; B60R 2021/0051; B61D 3/184; A61J 15/0015; A61J 15/0026; A61J 15/0038; A61J 15/0057; A61B 17/3415
USPC .................................................. 296/193.02
See application file for complete search history.

(56) References Cited

U.S. PATENT DOCUMENTS

| 5,070,717 | A | * | 12/1991 | Boyd et al. ........................ 72/55 |
| 5,729,463 | A | | 3/1998 | Koenig et al. |
| 5,791,673 | A | * | 8/1998 | Patterson ................... 280/281.1 |
| 5,953,945 | A | | 9/1999 | Horton |
| 6,227,321 | B1 | | 5/2001 | Frascaroli et al. |

(Continued)

OTHER PUBLICATIONS

Bolster-LCA-Infographic "Automotive Lightweighting With Plastics Results in Reduced Fuel Use and CO2 Emissions".

*Primary Examiner* — Kiran B Patel
(74) *Attorney, Agent, or Firm* — Avery N. Goldstein; Blue Filament Law, PLLC

(57) ABSTRACT

A vehicle front end load bearing bolster is provided with improved structural performance and a lower component weight, while also minimizing material, tooling, and production costs. The front end assembly is formed with a hydro-formed cross car reinforcement tube secured or bonded with mechanical fasteners and room temperature adhesive to a bolster, thereby improving stress distribution and increasing cross car system stiffness. The bonded hydro-form tube/bolster assembly provides increased torsion stiffness and dimensional stability to the vehicle frame. The hydro-formed cross car reinforcement tube have flattened terminal ends with apertures for integrated attachment to a bolster. The hydro-formed cross car reinforcement tube is formed of aluminum, brass, carbon, steel, stainless steel, copper and high strength alloys. The bolster is formed of high strength plastics and composites including sheet molding compounds (SMC), bulk molding compounds (BMC), and thermoplastic compounds such as glass mat thermoplastic (GMT) and direct long fiber thermoplastic (DLFT).

6 Claims, 3 Drawing Sheets

(56) References Cited

U.S. PATENT DOCUMENTS

| | | |
|---|---|---|
| 6,428,046 B1 | 8/2002 | Kocer et al. |
| 6,467,834 B1 | 10/2002 | Barz et al. |
| 7,441,819 B2 | 10/2008 | Azzouz et al. |
| 8,534,109 B1* | 9/2013 | Golovashchenko ....... 72/342.96 |
| 8,550,545 B1* | 10/2013 | Stojkovic et al. ....... 296/193.09 |
| 9,067,252 B2* | 6/2015 | Christianson et al. |
| 2002/0162224 A1 | 11/2002 | Gabbianelli et al. |
| 2003/0090128 A1* | 5/2003 | Seksaria et al. ............. 296/192 |
| 2004/0074095 A1* | 4/2004 | Stempien et al. ......... 29/890.08 |
| 2004/0150208 A1* | 8/2004 | Nathan et al. ................ 280/781 |
| 2005/0017543 A1 | 1/2005 | Riley et al. |
| 2005/0044913 A1* | 3/2005 | Ni et al. ............................ 72/61 |
| 2007/0074808 A1 | 4/2007 | Deachin et al. |
| 2008/0073926 A1 | 3/2008 | Azzouz et al. |
| 2008/0133026 A1* | 6/2008 | Lei et al. ................... 623/23.54 |
| 2008/0203768 A1* | 8/2008 | Lowe ............................ 296/205 |
| 2008/0217934 A1* | 9/2008 | Hori et al. .................... 293/102 |
| 2011/0250058 A1* | 10/2011 | Suchezky .................... 415/189 |
| 2012/0047979 A1* | 3/2012 | Hertell et al. .................... 72/58 |
| 2012/0242113 A1 | 9/2012 | Yasuhara et al. |
| 2012/0285213 A1* | 11/2012 | Golovashchenko .............. 72/61 |
| 2012/0312060 A1* | 12/2012 | Golovashchenko .............. 72/54 |
| 2013/0069395 A1* | 3/2013 | Nusier et al. ............ 296/203.03 |
| 2013/0093163 A1* | 4/2013 | Bernart et al. ................ 280/511 |
| 2013/0294936 A1* | 11/2013 | Worden et al. ................. 417/53 |

* cited by examiner

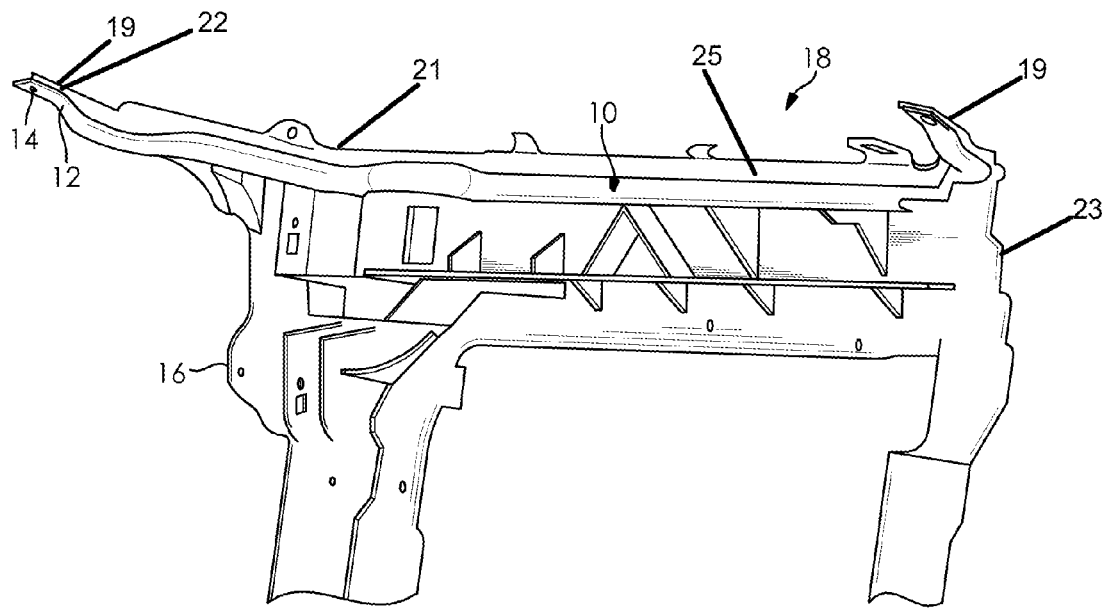
FIG. 4
  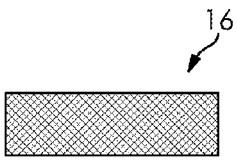
FIG. 5A  FIG. 5B  FIG. 5C
(section C-C) (section C-C) (section C-C)
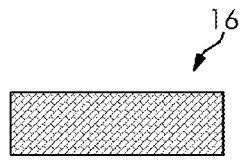 
FIG. 5D  FIG. 5E
(section C-C) (section C-C)

HYDRO-FORM BONDED BOLSTER

RELATED APPLICATIONS

This application claims priority benefit of U.S. Provisional Application Ser. No. 61/827,819 filed May 28, 2013; the contents of which are hereby incorporated by reference.

FIELD OF THE INVENTION

The present invention in general relates to vehicle front end architecture and, more particularly, to a hydro-form tube with integrated attachment to a bolster.

BACKGROUND OF THE INVENTION

Hydroforming is a cost-effective method of shaping ductile metals such as aluminum, brass, low alloy steels, and stainless steel into lightweight, structurally stiff and strong pieces. Hydroforming is widely used in the automotive industry for making complex shapes that are made possible by the hydroforming process to produce stronger, lighter, and more rigid unibody structures for vehicles, as well as in the shaping of aluminum tubes for bicycle frames. Hydroforming is a specialized type of die forming that uses a high pressure hydraulic fluid to press room temperature working material into a die. In order to hydroform aluminum into a vehicle's frame rail, a hollow tube of aluminum is placed inside a negative mold that has the shape of the desired result. High pressure hydraulic pumps inject fluid at very high pressure inside the aluminum, which causes the aluminum to expand until it matches the mold. The hydroformed aluminum is then removed from the mold. Hydroforming allows complex shapes with concavities to be formed, which would be difficult or impossible with standard solid die stamping. Hydroformed parts can often be made with a higher stiffness-to-weight ratio and at a lower per unit cost than traditional stamped or stamped and welded parts. Virtually all metals capable of cold forming can be hydroformed, including aluminum, brass, carbon and stainless steel, copper, and high strength alloys.

The design of the front end architecture of a vehicle is often influenced by assembly requirements for engine installation, and the vehicle's cooling system module. Furthermore, installation clearances for the front bumper often require splitting the lower bar radiator support away from the bolster, which may require a roll form stamping of the lower bar to meet structural requirements.

Thus, there exists a need for front end load bearing bolsters with improved structural performance and lower component weight, while also minimizing material, tooling, and production costs.

SUMMARY OF THE INVENTION

An inventive vehicle assembly includes a hydro-formed reinforcement tube, and a bolster, where the hydro-formed reinforcement tube is joined with the bolster, and is used as a front end cross car load bearing component joined to a vehicle frame. In an inventive embodiment, the hydro-formed reinforcement tube is bonded to the bolster with an adhesive. In an inventive embodiment, the hydro-formed reinforcement tube has flattened terminal ends with one or more apertures therein for integrated attachment to the bolster, and wherein the apertures are configured for mechanical fasteners. In an inventive embodiment, the hydro-formed reinforcement tube is formed from at least one of aluminum, brass, carbon, steel, stainless steel, copper, and high strength alloys, and the bolster is formed of high strength plastics or composites such as sheet molding compounds (SMC) or bulk molding compounds (BMC), and thermoplastic compounds such as glass mat thermoplastic (GMT) and direct long fiber thermoplastic (DLFT).

A process is provided for producing an inventive vehicle assembly by hydro-forming a cross car reinforcement tube, and joining the reinforcement tube to a bolster with an adhesive and mechanical fasteners.

BRIEF DESCRIPTION OF THE DRAWINGS

The present invention is further detailed with respect to the following drawings that are intended to show certain aspects of the present invention, but should not be construed as a limit on the practice of the present invention.

FIG. 4 is a perspective view of the bonded hydro-form tube/bolster assembly of FIG. 2A including a tie into a hood latch bracket; and FIGS. 5A-5E are a series of sectional views along line C-C through a portion of the bolster as shown in FIG. 4 showing the high strength plastics and composites used to form the bolster in accordance with embodiments of the invention.

DESCRIPTION OF THE INVENTION

The present invention has utility as a vehicle front end load bearing bolster with improved structural performance and a lower component weight, while also minimizing material, tooling, and production costs. Embodiments of the inventive front end assembly are formed with a hydro-formed cross car reinforcement tube secured or bonded with mechanical fasteners (bolts, rivets, screws, etc.) and room temperature adhesive to a bolster, thereby improving stress distribution and increasing cross car system stiffness. Embodiments of the bonded hydro-form tube/bolster assembly provide increased torsion stiffness and dimensional stability to the vehicle frame. Embodiments of the inventive hydro-formed cross car reinforcement tube have flattened terminal ends with one or more apertures for integrated attachment to a bolster. In embodiments, the hydro-formed cross car reinforcement tube may be formed of aluminum, brass, carbon, steel, stainless steel, copper and high strength alloys. Embodiments of the bolster may be formed of high strength plastics and composites. Composites may include sheet molding compounds (SMC), bulk molding compounds (BMC), and thermoplastic compounds such as glass mat thermoplastic (GMT) and direct long fiber thermoplastic (DLFT).

Figure 1A:
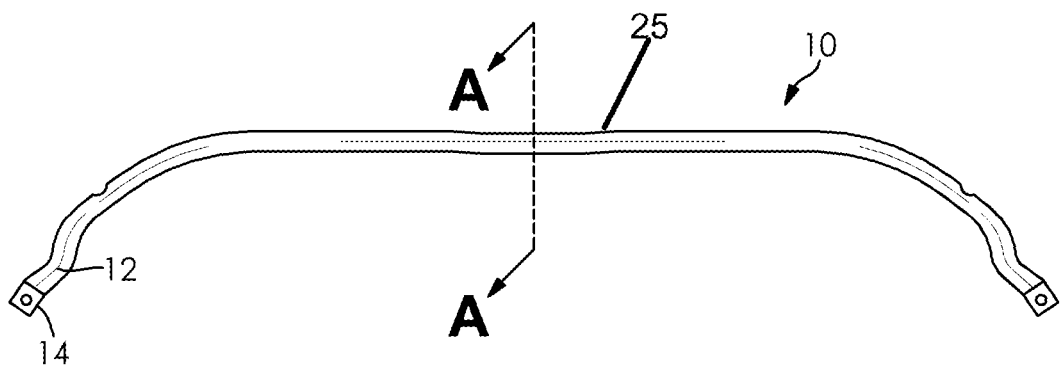
FIG. 1A is a top perspective view of a hydro-form tube with flattened end terminations with apertures for securing mechanical fasteners according to an embodiment of the invention.
Figure 1B:
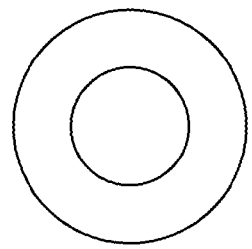
FIG. 1B is a sectional view along line A-A through the hydro-form tube of FIG. 1A according to embodiments of the invention.
Figure 2A:
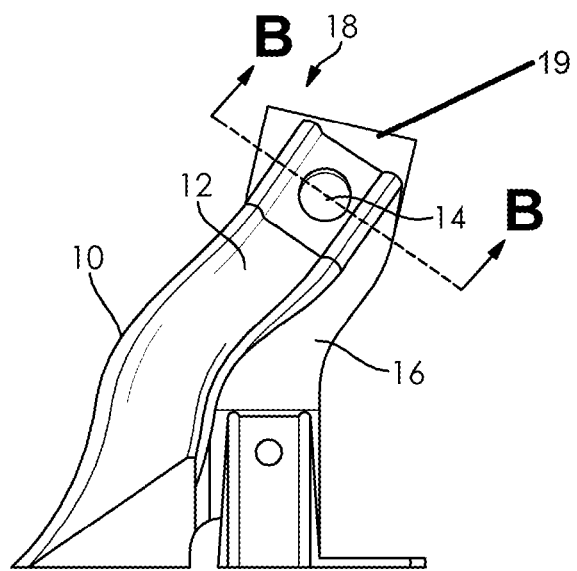
FIG. 2A is a detail perspective view of the flattened end termination with aperture of the hydro-form tube as depicted in FIG. 1A bonded to a bolster prior to fastener insertion according to an embodiment of the invention.
Figure 2B:
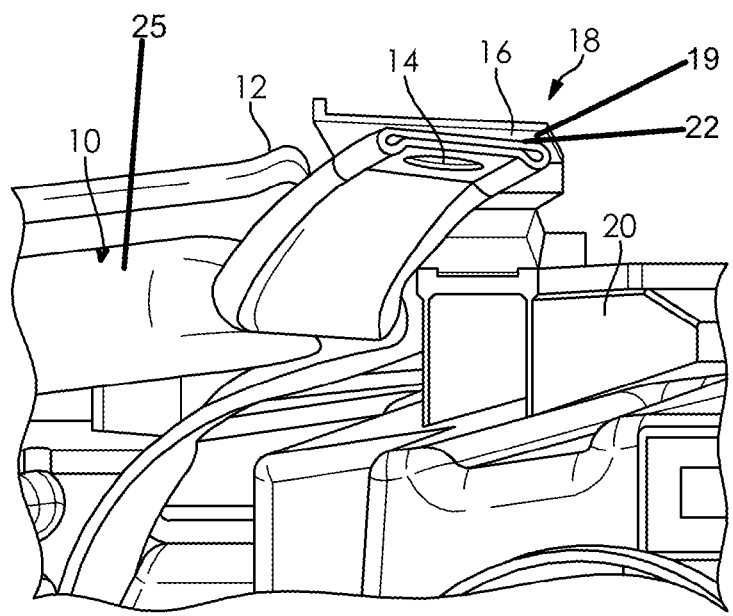
FIG. 2B is a side perspective view of the bonded hydro-form tube/bolster assembly of FIG. 2A joined with a vehicle frame member.
Figure 3A:
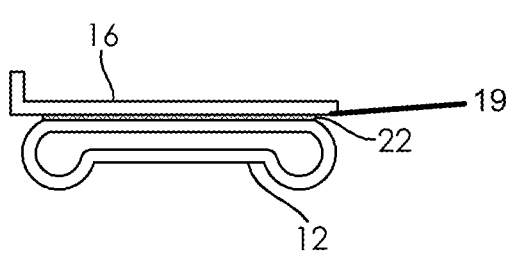
FIG. 3A is a sectional view along line B-B through the flattened end termination with aperture of the hydro-form tube bonded to the bolster of FIG. 2A with an adhesive according to an embodiment of the invention.
Figure 3B:
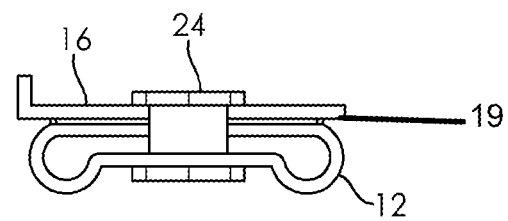
FIG. 3B is a sectional view along line B-B through the flattened end termination with aperture of the hydro-form tube joined to the bolster of FIG. 2A with a fastener according to an embodiment of the invention.

In a specific inventive embodiment, the hydro-formed cross car reinforcement tube may have a centerline length of 1530 mm with the following part weights 3 lbs at 2.0 mm thick or 2.25 lbs at 1.5 mm thick Referring now to the figures, FIG. 1A is a top perspective view of a hydro-form tube 10 having a central section 25 with flattened end terminations 12 with apertures 14 for securing mechanical fasteners according to an embodiment of the invention. FIG. 1B is a sectional view along line A-A through the hydro-form tube 10 of FIG. 1A. FIG. 2A is a detailed perspective view of the flattened end termination 12 with aperture 14 as depicted in FIG. 1A bonded to a bolster 16 prior to fastener insertion to form hydro-form tube/bolster assembly 18 according to an embodiment of the invention. FIG. 2B is a side perspective view of the bonded hydro-form tube/bolster assembly 18 of FIG. 2A joined with a vehicle frame member 20. FIG. 3A is a sectional view along line B-B through the flattened end termination 12 with aperture 14 of the hydro-form tube 10 bonded to the unitary piece bolster 16 of FIG. 2A with an adhesive 22. FIG. 3B is a sectional view along line B-B through the flattened end termination 12 with aperture 14 of the hydro-form tube 10 joined to the bolster 16 of FIG. 2A with a fastener 24. FIG. 4 is a perspective view of the bonded hydro-form tube/bolster assembly 18 of FIG. 2A having two opposing bonding surfaces 19 along a top surface 21 and having a portion 23 extending substantially perpendicular to the top surface. The bolster 10 having a central section 25, the central section 25 adapted to insert within said bolster 18. FIGS. 5A-5E are a series of sectional views along line C-C through a portion of the bolster 16 as shown in FIG. 4 showing the high strength plastics and composites used to form the bolster 16. FIG. 5A illustrates a high strength plastic forming the bolster 16. FIG. 5B illustrates sheet molding compounds (SMC) forming the bolster 16. FIG. 5C illustrates bulk molding compounds (BMC) forming the bolster 16. FIG. 5D illustrates glass mat thermoplastic (GMT) forming the bolster 16. FIG. 5E illustrates direct long fiber thermoplastic (DLFT) forming the bolster 16.

The foregoing description is illustrative of particular embodiments of the invention, but is not meant to be a limitation upon the practice thereof.

The invention claimed is:

1. A vehicle assembly comprising:
   a bolster having two opposing bonding surfaces along a top surface and having a portion extending substantially perpendicular to the top surface, where said bolster is formed of sheet molding compound, bulk molding compound, glass mat thermoplastic, or direct long fiber thermoplastic;
   a hydro-formed reinforcement tube with a circular cross-section along a central section, the central section adapted to insert within said bolster, where said hydro-formed reinforcement tube has two flattened terminal ends both curving backwards relative to the central section and adapted to each contact one of the two opposing bonding surfaces with one or more apertures therein for integrated attachment to said bolster with mechanical fasteners; and
   an adhesive bonding each of the two flattened terminal ends to one of the two opposing bonding surfaces wherein said vehicle assembly is a front end cross car component joined to a vehicle frame.

2. The assembly of claim 1 wherein said vehicle assembly is load bearing.

3. The assembly of claim 1 wherein said hydro-formed reinforcement tube is formed from at least one of aluminum, brass, carbon, steel, stainless steel, copper, and high strength alloys.

4. The assembly of claim 1 wherein said bolster is a unitary piece and formed of SMC.

5. The assembly of claim 1 wherein said bolster is a unitary piece and formed of glass mat thermoplastic.

6. The assembly of claim 1 wherein said bolster is a unitary piece and formed of direct long fiber thermoplastic.

* * * * *